Dec. 23, 1952     E. T. LORIG     2,622,720
ROLLER CONVEYER
Filed Sept. 7, 1950
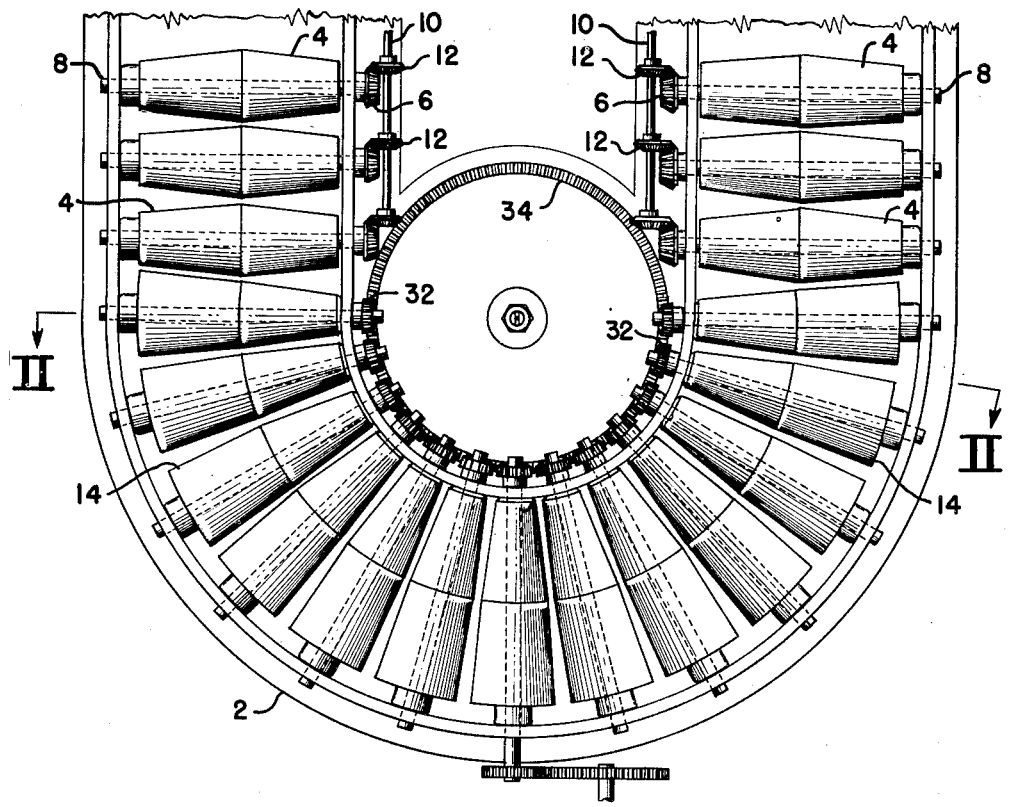
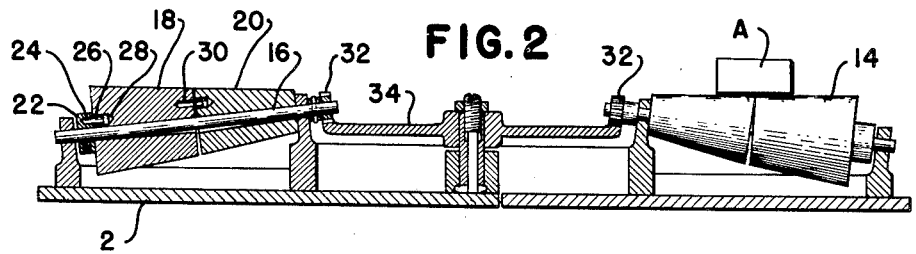
INVENTOR
EDWIN T. LORIG
BY *Donald G. Dalton*
ATTORNEY Patented Dec. 23, 1952

2,622,720

UNITED STATES PATENT OFFICE 2,622,720

ROLLER CONVEYER

Edwin T. Lorig, Pittsburgh, Pa., assignor to United States Steel Company, a corporation of New Jersey Application September 7, 1950, Serial No. 183,549

5 Claims. (Cl. 198—127)

This invention relates to roller conveyors and more particularly to conveyors for transporting objects having at least one relatively flat side. Such conveyors may be power driven or of the gravity type. In roller conveyors generally used there is a tendency for the objects being conveyed to creep off center as they travel over the rollers. To prevent objects from dropping off the sides of the conveyor side guides are utilized. Contact between the object and the stationary guide may result in jamming the conveyor system and damage to the object. In order to overcome these disadvantages, it has been proposed to use traveling side guides operating at a speed somewhat in excess of the speed at which the object travels on the conveyor system. Such guides are expensive and not completely satisfactory in most instances. In most cases the rollers of the conveyor are made considerably wider than the width of the object being conveyed in order to decrease the amount of contact between the guides and the objects being conveyed. It is often necessary to change the direction of travel of the object by providing bends in the conveyor. At these bends the disadvantages mentioned above are multiplied.

It is an object of my invention to provide a roller conveyor which will keep the objects being conveyed on the center line of the conveyor.

Another object is to provide a special roll assembly for use at the bends of a conveyor.

These and other objects will be more apparent after referring to the following specification and attached drawings, in which:

Figure 1 is a top plan view of my improved conveyor; and

Figure 2 is a view, partly in section, taken on the line II—II of Figure 1.

Referring more particularly to the drawings, the reference numeral 2 indicates the framework for supporting the rollers of the conveyor. Rollers 4 of the straight part of the conveyor are self-centering rolls preferably of the type shown in my copending applications, Serial No. 97,218, filed June 4, 1949, now Patent No. 2,593,157, Serial No. 138,389, filed January 13, 1950, now Patent No. 2,592,581, and Serial No. 145,648, filed February 23, 1950, now Patent No. 2,593,158. The rollers 4 are journalled in the framework 2 and have bevelled gears 6 mounted on their shafts 8. The bevelled gears 6 are driven from a drive shaft 10 through bevelled gears 12 mounted on the shaft 10.

The curved portion of the conveyor is provided with special rollers 14 which operate in much the same manner as rollers 4 in order to keep the object A being conveyed centered on the rollers. As best shown in Figure 2, each of these rollers consists of a shaft 16 journalled in the framework 2 and frusto-conical rolls 18 and 20 mounted on the shaft 16. Shaft 16 has a collar 22 mounted thereon adjacent its outer end. The collar 22 is provided with an opening 24 for receiving one end of a pin 26. The other end of the pin 26 is received in an opening 28 in the roll 18 so that the roll 18 is driven at the same speed as the shaft 16. The rolls 18 and 20 are driven in synchronism by means of a pin 30 which extends into aligned openings in the rolls 18 and 20. The inner end of each of the shafts 16 has a pinion 32 mounted thereon which is driven from a ring gear 34. It will be noted that both of the rolls 18 and 20 are frusto-conical in shape with the small diameter of roll 18 being substantially equal to the large diameter of roll 20. The upper surface of the roll assembly is slightly convex with the rolls 18 and 20 substantially in contact with each other. The lower parts of rolls 18 and 20 are separated as clearly shown in Figure 2. Sufficient clearance is provided between the shaft 16 and the rolls 18 and 20 so that the rotating rims of said rolls are free to tilt and move toward each other at the points of contact of the object being conveyed as shown in Figure 2 and more fully described in my above mentioned copending Patent No. 2,593,158. For best results the taper of the inner roll is made greater than the taper of the outer roll as shown in Figure 1.

While the rolls of the conveyor are shown as being driven, the same principles apply when the driving mechanism is omitted and the conveyor used as a gravity conveyor. While the conveyor is shown with a 180° bend therein, the arc may be much less or as great as 360°.

While one embodiment of my invention has been shown and described it may be apparent that other adaptations and modifications may be made without departing from the scope of the following claims.

I claim:

1. Apparatus for automatically centering an object moving around a bend comprising two frusto-conical rolls arranged transversely of the direction of movement of the object with the large diameter of the inner roll being adjacent the small diameter of the outer roll, the large diameter of the inner roll being substantially equal to the small diameter of the outer roll, and means for causing the rolls to rotate in synchronism, the rotating rims of said rolls being free to tilt and move toward each other at the points of contact of said object.

2. Apparatus for automatically centering an object moving around a bend comprising a transverse shaft, two frusto-conical rolls mounted on said shaft with the large diameter of the inner roll adjacent the small diameter of the outer roll, the large diameter of the inner roll being substantially equal to the small diameter of the outer roll, said rolls having aligned openings therethrough of greater diameter than the diameter of said shaft so that the rotating rims of said rolls are free to tilt and move toward each other at the points of contact of the object being conveyed, and means for causing the rolls to rotate in synchronism.

3. A conveyor for objects having a flat surface comprising a roll-supporting framework having a straight portion and a bend therein, a plurality of transverse self-centering rollers rotatably mounted on the straight portion of said framework, said self-centering rollers being spaced apart longitudinally of said framework, and a plurality of self-centering rollers rotatably mounted on the bend of said framework with the axes of said rollers being arranged radially of said bend; each of said last named rollers comprising two frusto-conical rolls arranged with the large diameter of the inner roll adjacent the small diameter of the outer roll, the large diameter of the inner roll being substantially equal to the small diameter of the outer roll, and means for causing the rolls of each of said last named rollers to rotate in synchronism.

4. A conveyor for objects having a flat surface comprising a roll-supporting framework having a straight portion and a bend therein, a plurality of transverse self-centering rollers rotatably mounted on the straight portion of said framework, said self-centering rollers being spaced apart longitudinally of said framework, and a plurality of self-centering rollers rotatably mounted on the bend of said framework with the axes of said rollers being arranged radially of said bend; each of said last named rollers comprising two frusto-conical rolls arranged with the large diameter of the inner roll adjacent the small diameter of the outer roll, the large diameter of the inner roll being substantially equal to the small diameter of the outer roll, and means for causing the rolls of each of said last named rollers to rotate in synchronism, the rotating rims of said rolls being free to tilt and move toward each other at the points of contact of the object being conveyed.

5. A conveyor for objects having a flat surface comprising a roll-supporting framework having a straight portion and a bend therein, a plurality of tranverse self-centering rollers rotatably mounted on the straight portion of said framework, said self-centering rollers being spaced apart longitudinally of said framework, and a plurality of self-centering rollers rotatably mounted on the bend of said framework with the axes of said rollers being arranged radially of said bend; each of said last named rollers comprising a transverse shaft, two frusto-conical rolls mounted on said shaft with the large diameter of the inner roll adjacent the small diameter of the outer roll, the large diameter of the inner roll being substantially equal to the small diameter of the outer roll, said rolls having aligned openings therethrough of greater diameter than the diameter of said shaft so that the rotating rims of said rolls are free to tilt and move toward each other at the points of contact of the object being conveyed, and means for causing the rolls of each of said last named rollers to rotate in synchronism.

EDWIN T. LORIG.

REFERENCES CITED

The following references are of record in the file of this patent:

UNITED STATES PATENTS

| Number | Name | Date |
| --- | --- | --- |
| 445,290 | Treat | Jan. 27, 1891 |
| 866,337 | Cowley | Sept. 17, 1907 |
| 872,856 | Spence | Dec. 3, 1907 |
| 1,437,784 | Taisey | Dec. 5, 1922 |
| 1,756,653 | McArthur | Apr. 29, 1930 |
| 1,795,137 | Nye | Mar. 3, 1931 |
| 1,846,665 | Adams | Feb. 23, 1932 |
| 2,262,325 | Kendall | Nov. 11, 1941 |